(12) United States Patent
Holland (10) Patent No.: US 10,207,792 B2
(45) Date of Patent: Feb. 19, 2019

(54) SYSTEM AND METHOD FOR NOSE CONE EDGE DELAMINATION REPAIR

(71) Applicant: UNITED TECHNOLOGIES CORPORATION, Farmginton, CT (US)

(72) Inventor: Brian K. Holland, Mason, MI (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 472 days.

(21) Appl. No.: 15/162,104

(22) Filed: May 23, 2016

(65) Prior Publication Data

US 2017/0334547 A1 Nov. 23, 2017

(51) Int. Cl.
*B64C 11/14* (2006.01)
*F02C 7/04* (2006.01)
*F04D 29/32* (2006.01)
*F04D 29/38* (2006.01)
*B29C 73/10* (2006.01)
*F01D 5/00* (2006.01)
*F01D 5/30* (2006.01)

(52) U.S. Cl.
CPC .............. *B64C 11/14* (2013.01); *B29C 73/10* (2013.01); *F01D 5/005* (2013.01); *F01D 5/3015* (2013.01); *F02C 7/04* (2013.01); *F04D 29/329* (2013.01); *F04D 29/38* (2013.01); *F05D 2220/323* (2013.01); *F05D 2220/36* (2013.01); *F05D 2230/80* (2013.01); *F05D 2300/603* (2013.01); *Y02T 50/673* (2013.01)

(58) Field of Classification Search
CPC ......... B64C 11/14; B29C 73/10; F01D 5/005; F01D 5/3015; F02C 7/04; F04D 29/329; F04D 29/38; Y02T 50/673; F05D 2220/36; F05D 2220/323; F05D 2300/603; F05D 2230/80
See application file for complete search history.

(56) References Cited

U.S. PATENT DOCUMENTS 2,401,247 A * 5/1946 Hunter .................... B64C 11/14
219/202
5,833,435 A * 11/1998 Smith ...................... F02C 7/04
416/94

(Continued)

FOREIGN PATENT DOCUMENTS

EP 1775445 4/2007

OTHER PUBLICATIONS

EP Search Report dated Oct. 19, 2017 in EP Application No. 17172282.0.

*Primary Examiner* — Dwayne J White
*Assistant Examiner* — Adam W Brown
(74) *Attorney, Agent, or Firm* — Snell & Wilmer, L.L.P.

(57) ABSTRACT

A system and method for nose cone edge delamination repair is provided. A nose cone may comprise an outer skirt having an aft edge, a flange, and a pin landing. The system and method may comprise trimming the aft edge of the nose cone to form a repaired edge. A first layer of fiberglass may be placed over repaired edge. A second layer of fiber glass may be placed over the first layer and the repaired edge. The first layer and second layer may be trimmed to create a spot face to allow for lower tolerances when installing the nose cone into a gas turbine engine.

20 Claims, 9 Drawing Sheets

(56) References Cited

U.S. PATENT DOCUMENTS

| | | | | |
|---|---|---|---|---|
| 6,561,763 B2* | 5/2003 | Breakwell | ............... | B64C 11/14 |
| | | | | 416/245 R |
| 6,942,462 B2* | 9/2005 | Breakwell | ............... | B64C 11/14 |
| | | | | 416/245 R |
| 7,575,417 B2* | 8/2009 | Finn | ........................ | F01D 5/147 |
| | | | | 416/230 |
| 8,206,096 B2* | 6/2012 | Prentice | .................. | F01D 5/282 |
| | | | | 415/191 |
| 8,449,260 B2* | 5/2013 | Xie | ........................... | F01D 5/06 |
| | | | | 416/189 |
| 8,753,094 B2* | 6/2014 | Bottome | ............. | H01M 2/0235 |
| | | | | 416/245 R |
| 9,539,767 B2* | 1/2017 | Butler | ................. | B29C 35/0288 |
| 2007/0234544 A1 | 10/2007 | Bogue | | |

* cited by examiner

SYSTEM AND METHOD FOR NOSE CONE EDGE DELAMINATION REPAIR

FIELD

The present disclosure relates to nose cones for gas turbine engines, and more specifically, to systems and methods for nose cone edge delamination repair.

BACKGROUND

Gas turbine engines typically include a fan section to drive inflowing air, a compressor section to pressurize inflowing air, a combustor section to burn a fuel in the presence of the pressurized air, and a turbine section to extract energy from the resulting combustion gases. The fan section may include a plurality of fan blades coupled to a fan hub, with a nose cone arranged forward of the fan blades to provide an aerodynamic flow path. Delamination may occur on an aft edge of an outer skirt of the nose cone during maintenance and/or repair of the nose cone, and/or during operation of the gas turbine engine.

SUMMARY

In various embodiments, a system and method for nose cone delamination repair is disclosed. In various embodiments, a nose cone may comprise an outer skirt. The outer skirt may have an axially inner surface opposite of an axially outer surface, and a repaired edge. The repaired edge may have a first edge and a second edge. The first edge may be substantially perpendicular with the second edge. The nose cone may comprise a pin landing coupled to the axially inner surface near the repaired edge. The nose cone may comprise a first layer coupled to the repaired edge and having a first end and a second end. The first end may extend in an axial direction past the repaired edge and onto the axially outer surface of the outer skirt, and the second end may extend in an axial direction past the repaired edge and onto the pin landing. The nose cone may comprise a second layer coupled to the first layer and having a third edge and a fourth edge. The third edge of the second layer may extend past the first end of the first layer, and the fourth edge of the second layer may extend past the second end of the first layer.

In various embodiments, the nose cone may further comprise a spot face located on the second layer and the first layer proximate the pin landing. The spot face may be bounded by the second layer and the first layer. In various embodiments, the nose cone may further comprise a flange coupled to the axially inner surface of the outer skirt forward the pin landing. In various embodiments, the first layer and the second layer may be formed using at least one of a wet layup method or a pre-impregnated method. In various embodiments, the first end of the first layer may extend in the axial direction past the repaired edge and onto the axially outer surface of the outer skirt at a first distance. The second end of the first layer may extend in the axial direction past the repaired edge and onto the pin landing at the first distance. In various embodiments, the third edge of the second layer may extend past the first end of the first layer at a second distance. The fourth edge of the second layer may extend past the second end of the first layer at the second distance. The second distance may be equal to the first distance. In various embodiments, the first distance may be from about 0.05 inches to about 2.0 inches.

In various embodiments, a method is disclosed. The method may comprise trimming an aft edge of an outer skirt of a nose cone to form a repaired edge. The method may comprise placing a first layer onto the repaired edge. The method may comprise placing a second layer on top of the first layer, wherein the second layer extends past the first layer. The method may comprise trimming the first layer and the second layer to form a spot face.

In various embodiments, the method may further comprise forming the first layer and the second layer using a wet layup method. In various embodiments, the method may further comprise forming the first layer and the second layer using a pre-impregnated method. In various embodiments, the method may further comprise extending the first layer in an axial direction onto the outer skirt at a first distance, and extending the first layer in the axial direction onto a pin landing at the first distance. In various embodiments, the method may further comprise extending the second layer in the axial direction to extend past the first layer at a second distance, wherein the second distance is equal to the first distance. In various embodiments, the method may further comprise extending the first layer at the first distance of about 0.05 inches to about 2.0 inches. In various embodiments, the method may further comprise applying a protective coating over the first layer and the second layer.

In various embodiments, a fan section for a gas turbine engine is disclosed. The fan section may comprise a fan hub, a plurality of fan blades coupled to the fan hub, and a nose cone coupled to the fan hub forward of the plurality of fan blades. The nose cone may comprise an outer skirt. The outer skirt may have an axially inner surface opposite of an axially outer surface, and a repaired edge. The repaired edge may have a first edge and a second edge. The first edge may be substantially perpendicular with the second edge. The nose cone may comprise a pin landing coupled to the axially inner surface near the repaired edge. The nose cone may comprise a first layer coupled to the repaired edge and having a first end and a second end. The first end may extend in an axial direction past the repaired edge and onto the axially outer surface of the outer skirt, and the second end may extend in the axial direction past the repaired edge and onto the pin landing. The nose cone may comprise a second layer coupled to the first layer and having a third edge and a fourth edge. The third edge of the second layer may extend past the first end of the first layer, and the fourth edge of the second layer may extend past the second end of the first layer.

In various embodiments, the fan section may further comprise a plurality of fan platforms coupled to the fan hub using a fan platform pin. A spot face may be located on the second layer and the first layer proximate the pin landing. The spot face may be bounded by the second layer and the first layer. The fan platform pin may abut the pin landing at a location of the spot face. The first layer and the second layer may be formed using at least one of a pre-impregnated method or a wet layup method. The first layer may extend over the repaired edge at a first distance, and the second layer may extend past the first layer at a second distance equal to the first distance.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1A:
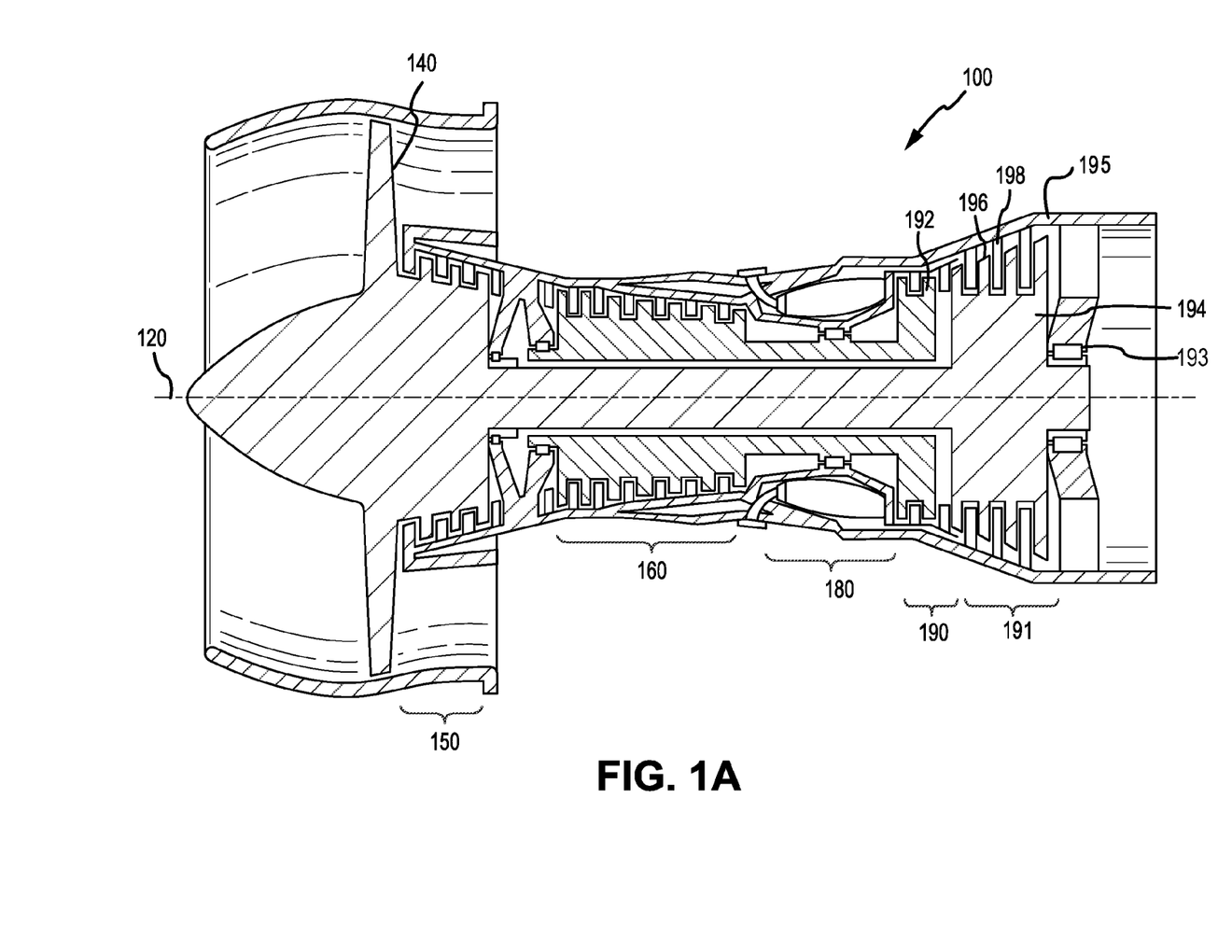
FIG. 1A illustrates a cross-section view of a gas turbine engine, in accordance with various embodiments.

In various embodiments, and with reference to FIG. 1A, a gas turbine engine 100 (such as a turbofan gas turbine engine) is illustrated. Gas turbine engine 100 is disposed about axial centerline axis 120, which may also be referred to as axis of rotation 120. Gas turbine engine 100 may comprise a fan section 140, compressor sections 150 and 160, a combustion section 180, and turbine sections 190, 191. The fan section 140 may drive air into compressor sections 150, 160, which may further drive air along a core flow path for compression and communication into the combustion section 180. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198, housed within an engine casing 195. Cooling air may be supplied to the turbine sections 190, 191 from the compressor sections 150, 160. A plurality of bearings 193 may support spools in the gas turbine engine 100. FIG. 1A provides a general understanding of the sections in a gas turbine engine, and is not intended to limit the disclosure. The present disclosure may extend to all types of applications and to all types of turbine engines, including turbofan gas turbine engines and turbojet engines.

Figure 1B:
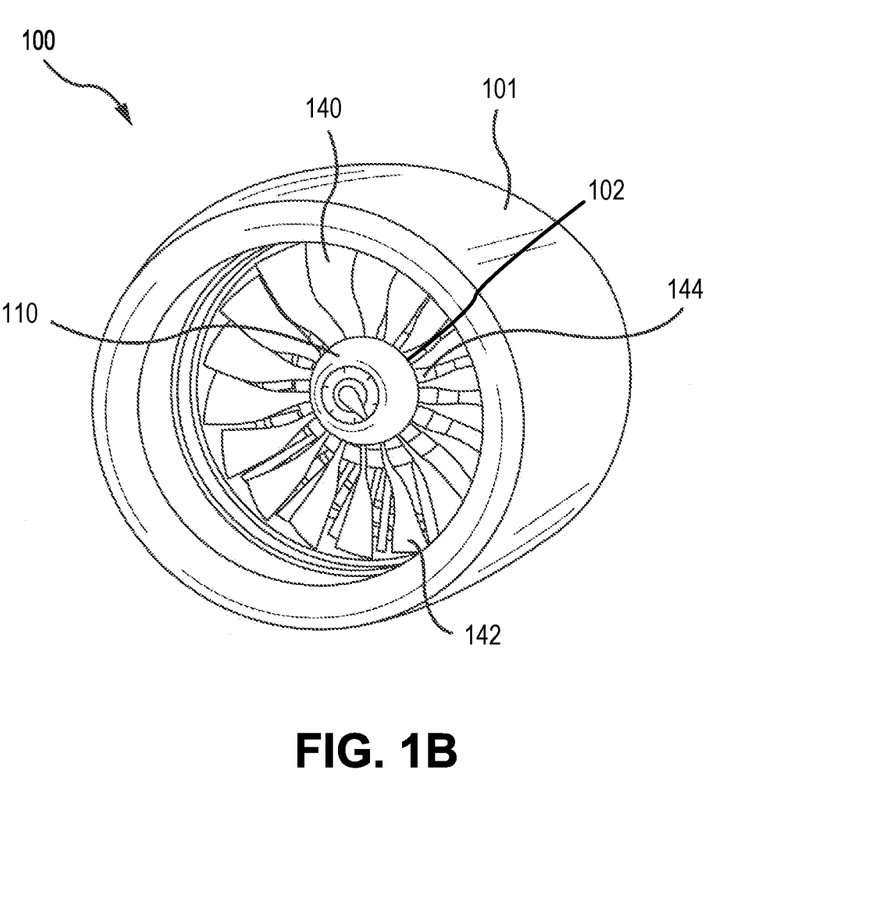
FIG. 1B illustrates a perspective view of a front portion of a gas turbine engine, in accordance with various embodiments.

In various embodiments, and with reference to FIG. 1B, a perspective view of a front portion of gas turbine engine 100 is depicted in greater detail. Gas turbine engine 100 may comprise nacelle 101, fan section 140, and nose cone 110. Fan section 140 may comprise a plurality of circumferentially arranged fan blades 142. Fan platforms 144, or spacers, may be arranged between adjacent fan blades 142. Fan blades 142 may be mounted to a fan hub 102 located radially inward of fan platforms 144. Nose cone 110 may be arranged forward of fan blades 142 to provide an aerodynamic flow path through fan section 140 along with fan platforms 144.

Figure 2A:
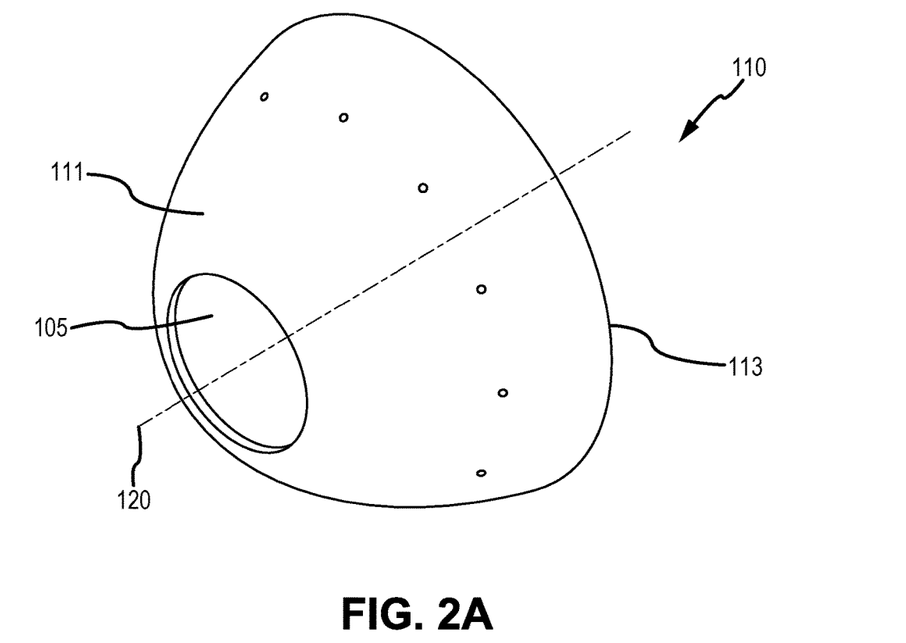
FIG. 2A illustrates a forward perspective view of a nose cone, in accordance with various embodiments.
Figure 2B:
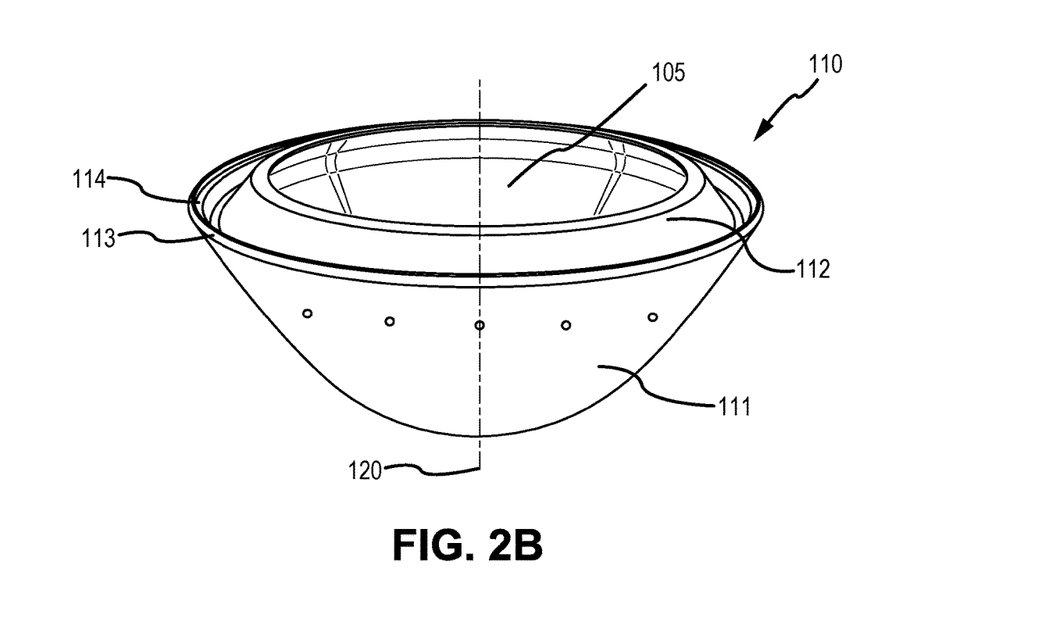
FIG. 2B illustrates an aft perspective view of a nose cone, in accordance with various embodiments.
Figure 2C:
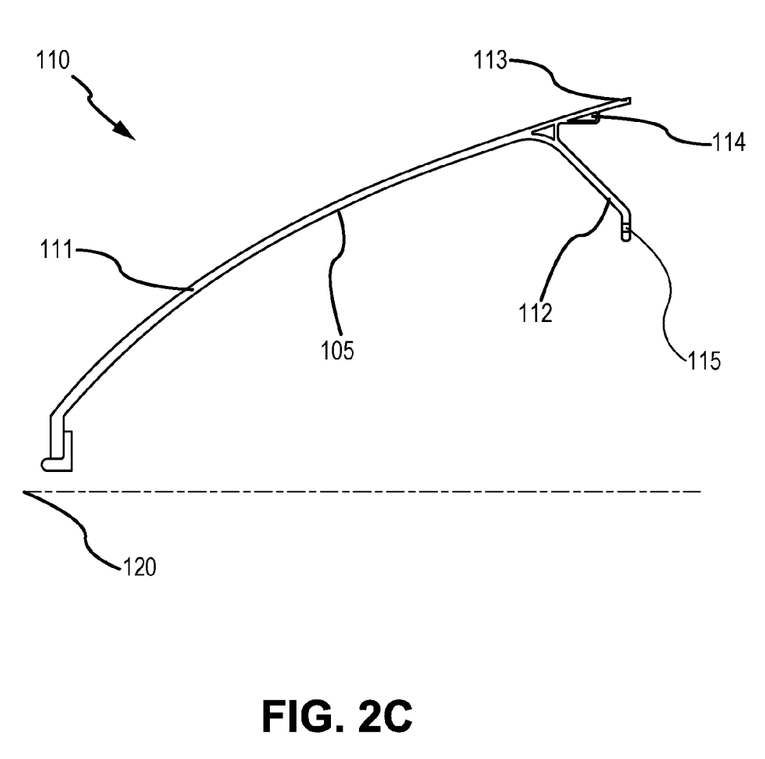
FIG. 2C illustrates a cross-section view of a nose cone, in accordance with various embodiments.

In various embodiments, and with reference to FIGS. 2A, 2B, and 2C, nose cone 110 is depicted in greater detail. Nose cone 110 may comprise an outer skirt 111 configured to aid in providing the aerodynamic flow path through fan section 140 (with brief reference to FIGS. 1A and 1B). In that regard, outer skirt 111 may comprise any suitable shape capable of aiding aerodynamic flow, such as, for example, a conical shape. In various embodiments, outer skirt 111 may comprise any suitable material. For example, outer skirt 111 may comprise a synthetic fiber having high-tensile strength, such as an aramid fiber (e.g., Kevlar®) and/or the like. In various embodiments, outer skirt 111 may comprise various layers of aramid fiber (e.g., Kevlar®), and/or other suitable material, placed on top of one another to form outer skirt 111. Outer skirt 111 may comprise any suitable number of layers, such as, for example, one layer to forty layers, twenty layers to forty layers, and/or any other suitable number of layers. In various embodiments, the number of layers may be dependent on desired operational factors such as weight, strength, and/or the like. In various embodiments, outer skirt 111 may comprise twenty layers of material.

Figure 2D:
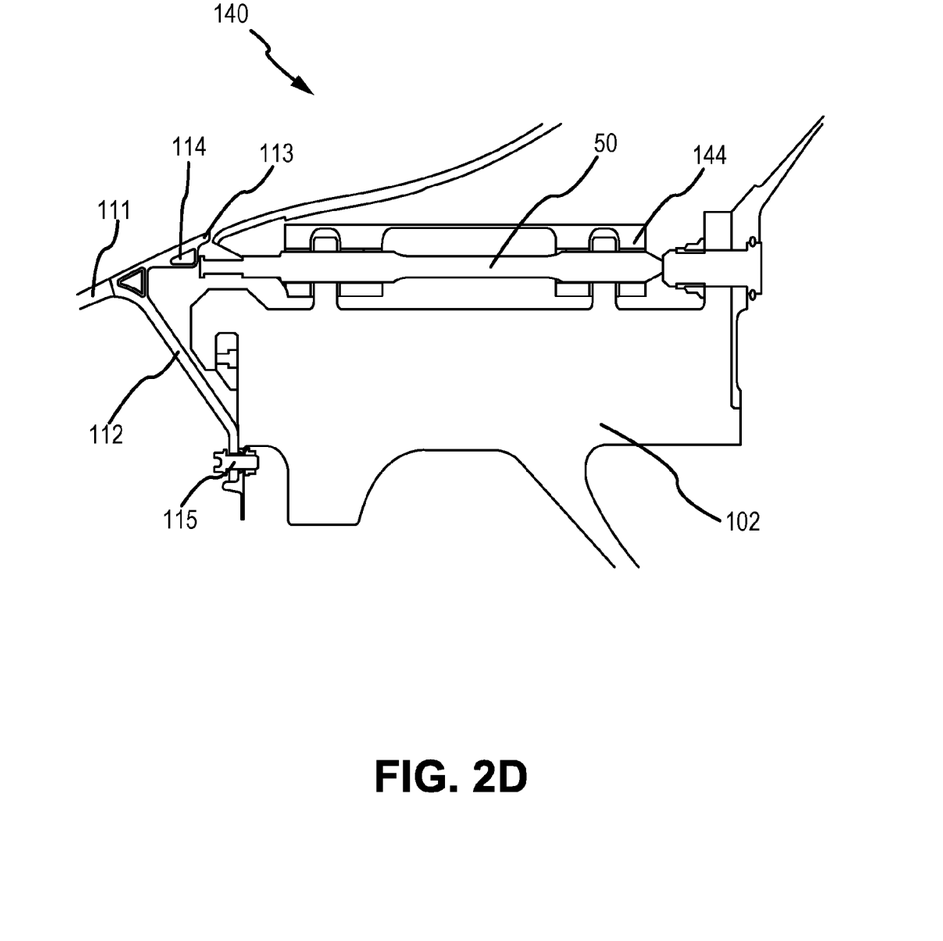
FIG. 2D illustrates a cross-section view of a nose cone attached to a fan section, in accordance with various embodiments.

In various embodiments, outer skirt 111 may comprise an axially inner surface 105 and an aft edge 113. Aft edge 113 may comprise the aft end of outer skirt 111. In various embodiments, nose cone 110 may comprise a flange 112 configured to couple nose cone 110 to a fan hub (e.g., fan hub 102 in FIG. 2D). Flange 112 may be coupled to axially inner surface 105 of outer skirt 111, and may extend in an axially inward direction (in regard to axis 120). Flange 112 may couple to the fan hub using any suitable technique, such as, for example through a bolt (e.g., as depicted in FIG. 2D), screw, fastener, and/or the like. In this regard, flange 112 may comprise a flange aperture 115 configured to receive a bolt, screw, fastener, and/or the like to couple flange 112 to the fan hub.

In various embodiments, nose cone 110 may comprise a pin landing 114 coupled to axially inner surface 105 of outer skirt 111, aft of flange 112. With reference to FIG. 2D, a fan platform pin 50 may be configured to couple fan platform 144 to fan hub 102. Fan platform pin 50 may be passed through fan hub 102 and fan platform 144 to couple fan platform 144 to fan hub 102. In response to nose cone 110 being attached to fan hub 102, pin landing 114 may be configured to retain fan platform pin 50 from sliding forward during operation. In that regard, pin landing 114 may comprise any suitable shape capable of helping hold fan platform pin 50 into position. For example, pin landing 114 may comprise a triangular shape such that fan platform pin 50 may abut an aft surface of pin landing 114 in response to nose cone 110 being attached to fan hub 102.

Figure 3:
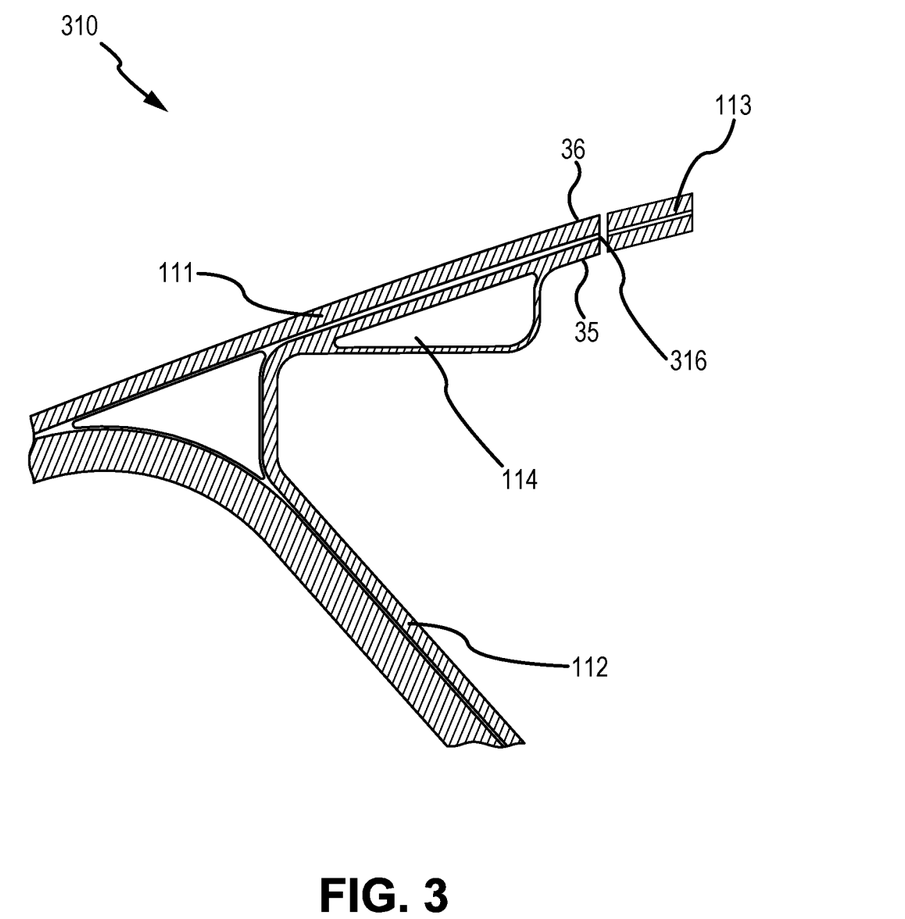
FIG. 3 illustrates a cross-section view of a nose cone having a repaired edge, in accordance with various embodiments.

In various embodiments, and with reference to FIG. 3, a nose cone 310 comprising a repaired edge 316 is depicted. During repair and/or maintenance of nose cone 310, and/or during operation of the engine, aft edge 113 may begin to delaminate. To repair delamination to aft edge 113, an epoxy resin, and/or the like, may be introduced into a delaminated material. The delaminated material may be clamped together and cured. A portion of aft edge 113 may be cut away from nose cone 310 to form repaired edge 316. In various embodiments, repaired edge 316 may be formed to allow for lower tolerances after repair, such as in response to a coupling of a first layer and a second layer (e.g., first layer 417 and second layer 418, with reference to FIG. 4) to nose cone 310 during repair. For example, repaired edge 316 may be formed such that the relative dimensions of nose cone 310 after the coupling of first layer 417 and second layer 418 during repair are substantially the same as the relative dimensions of nose cone 310 prior to forming repaired edge 316.

In that regard, and in various embodiments, the portion of aft edge 113 cut away to form repaired edge 316 may comprise a distance substantially equal to a thickness of the first layer and the second layer. For example, and with reference to FIG. 3 and FIG. 4, where first layer 417 comprises a thickness of about 0.01 inches (0.254 mm) and second layer 418 comprises a thickness of about 0.01 inches (0.254 mm), about 0.02 inches (0.508 mm) to about 0.025 inches (0.635 mm), or about 0.25 inches (0.635 mm) to about 0.03 inches (0.76 mm) may be cut from aft edge 113 to form repaired edge 316 (wherein about in this context refers only to +/−0.005 inches (0.127 mm)). In various embodiments, the portion of aft edge 113 cut away to form repaired edge 316 may also comprise a distance substantially equal to a thickness of a film adhesive, epoxy, and/or the like used to couple first layer 417 and second layer 418 to nose cone 310 (e.g., in a pre-impregnated method of formation). For example, where the film adhesive, epoxy, and/or the like comprises a thickness of about 0.01 inches (0.254 mm), about 0.03 inches (0.762 mm) to about 0.035 inches (0.889 mm), or about 0.035 inches (0.889 mm) to about 0.04 inches (1.02 mm) may be cut from aft edge 113 to form repaired edge 316 (wherein about in this context refers only to +/−0.005 inches (0.127 mm)). In various embodiments, the portion of aft edge 113 cut away to form repaired edge 316 may also comprise any other suitable and/or desired distance.

In various embodiments, repaired edge 316 may comprise a first edge 36 and a second edge 35. In response to the delaminated material being repaired and repaired edge 316 being formed, first edge 36 and second edge 35 may be substantially perpendicular with each other, such that repaired edge 316 comprises substantially no delaminated material.

In various embodiments, aft edge 113 may be cut using any suitable technique. For example, aft edge 113 may be cut using a milling machine, such as a horizontal mill. In various embodiments, in response to a large portion of the entire circumferential surface area of aft edge 113 comprising delaminated material, such as, for example, about 50%, about 60%, or about 70% of the circumferential surface area of aft edge 113 (wherein about in this context refers only to +/−5%), a lathe may be used to cut a larger surface area from aft edge 113. In various embodiments, any other suitable cutting technique may also be used to cut aft edge 113.

Figure 4:
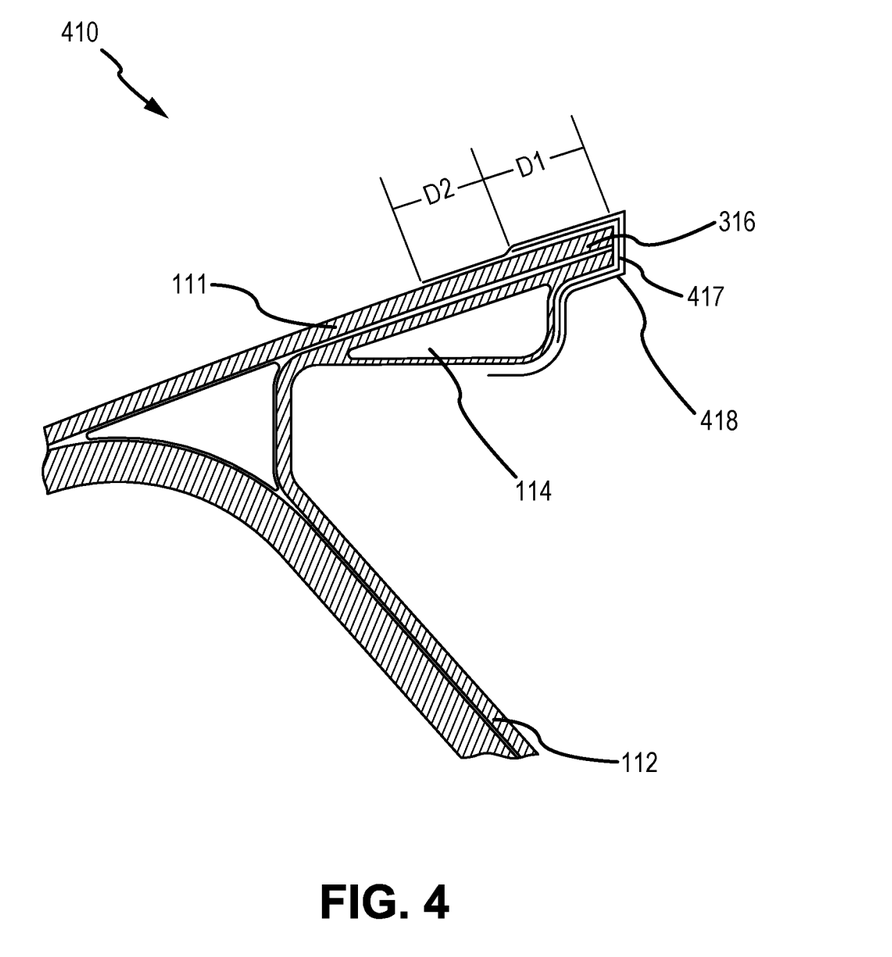
FIG. 4 illustrates a cross-section view of a nose cone having a first layer and a second layer located on an aft edge, in accordance with various embodiments.

In various embodiments, and with reference to FIG. 4, a nose cone 410 comprising a first layer 417 and a second layer 418 is disclosed. First layer 417 may be configured to couple onto outer skirt 111 and wrap around repaired edge 316 and pin landing 114. In this regard, first layer 417 may cover an area of repaired edge 316 where the delaminated material from aft edge 113 was repaired and removed to strengthen and help protect against future delamination. Second layer 418 may be configured to couple onto first layer 417 and outer skirt 111, and extend past first layer 417 in radial and axial directions. In that regard, second layer 418 may help hold first layer 417 into place and further strengthen repaired edge 316 to protect against future delamination. In various embodiments, first layer 417 and second layer 418 may comprise any suitable fibrous material, such as, for example, aramid fiber (e.g., Kevlar®), fiberglass, carbon fiber, and/or the like. In various embodiments, first layer 417 and second layer 418 may also comprise any suitable thickness.

In various embodiments, first layer 417 and second layer 418 may be formed using any suitable technique. In this regard, and in various embodiments, first layer 417 and second layer 418 may be formed by a wet layup method. In a wet layup method, resin may be introduced and cured onto outer skirt 111 at repaired edge 316. First layer 417 may be impregnated with resin and placed into position on outer skirt 111 at repaired edge 316, on top of the cured resin. Second layer 418 may be impregnated with resin and placed into position over first layer 417 and outer skirt 111. Pressure may then be applied to first layer 417 and second layer 418, via clamps, a vacuum bag, and/or the like, and first layer 417 and second layer 418 may be cured to complete the wet layup process. In various embodiments, first layer 417 and second layer 418 may also be formed by a pre-impregnation method. As used herein, the term "pre-impregnated" may refer to fibrous structures, having, for example, glass fibers, carbon fibers, aramid fibers, and/or the like, pre-impregnated with an uncured or at least partially uncured matrix material, such as a resin, where the substantial majority of fibers are generally completely encased in the matrix material. In that regard, first layer 417 and second layer 418 may be pre-impregnated with an uncured or at least partially uncured matrix material and laid on a mold to form a desired shape. First layer 417 and second layer 418 may then be cured to form the shape. First layer 417 and second layer 418 may be placed onto repaired edge 316 and coupled to repaired edge 316 and outer skirt 111 using an epoxy resin, and/or the like.

In various embodiments, first layer 417 may comprise any suitable size to cover repaired edge 316. First layer 417 may cover repaired edge 316 and extend onto outer skirt 111 and pin landing 114 at a distance D1. Distance D1 may comprise any suitable size. For example, distance D1 may be based on an interlaminar shear strength of first layer 417, taking into consideration factors such as the tensile strength of the fibrous material, the thickness of the fibrous material, the shear strength of the resin used to cure first layer 417, and/or the like. Distance D1 may also be based on desired weight calculations, as a greater distance D1 adds more weight to nose cone 410 (i.e., a greater distance D1 would be associated with greater material from first layer 417). In various embodiments, distance D1 may be about 0.05 inches (1.27 mm) to about 2.0 inches (50.8 mm), about 0.2 inches (5.1 mm) to about 2.0 inches (50.8 mm), about 0.4 inches (10.2 mm) to about 2.0 inches (50.8 mm), about 0.7 inches (17.8 mm) to about 2.0 inches (50.8 mm), or about 1.0 inches (25.4 mm) to about 2.0 inches (50.8 mm) (wherein about in this context refers only to +/−0.05 inches (1.27 mm)). In various embodiments, distance D1 may be 0.5 inches (12.7 mm) (wherein about in this context refers only to +/−0.05 inches (1.27 mm)).

In various embodiments, second layer 418 may comprise any suitable size to cover and/or extend past first layer 417. For example, second layer 418 may extend past first layer 417 at a distance D2. In various embodiments, distance D2 may comprise an equal distance with distance D1. For example, where distance D1 comprises 0.5 inches (12.7 mm), distance D2 may also comprise 0.5 inches (12.7 mm). Distance D2 may also be based on an interlaminar shear strength of second layer 418, and/or desired weight calculations for nose cone 410. Distance D2 may also comprise any other suitable size, such as, for example, about 0.05 inches (1.27 mm) to about 2.0 inches (50.8 mm), about 0.2 inches (5.1 mm) to about 2.0 inches (50.8 mm), about 0.4 inches (10.2 mm) to about 2.0 inches (50.8 mm), about 0.7 inches (17.8 mm) to about 2.0 inches (50.8 mm), or about 1.0 inches (25.4 mm) to about 2.0 inches (50.8 mm) (wherein about in this context refers only to +/−0.05 inches (1.27 mm)). In various embodiments, distance D2 may be 0.5 inches (12.7 mm) (wherein about in this context refers only to +/−0.05 inches (1.27 mm)).

Figure 5:
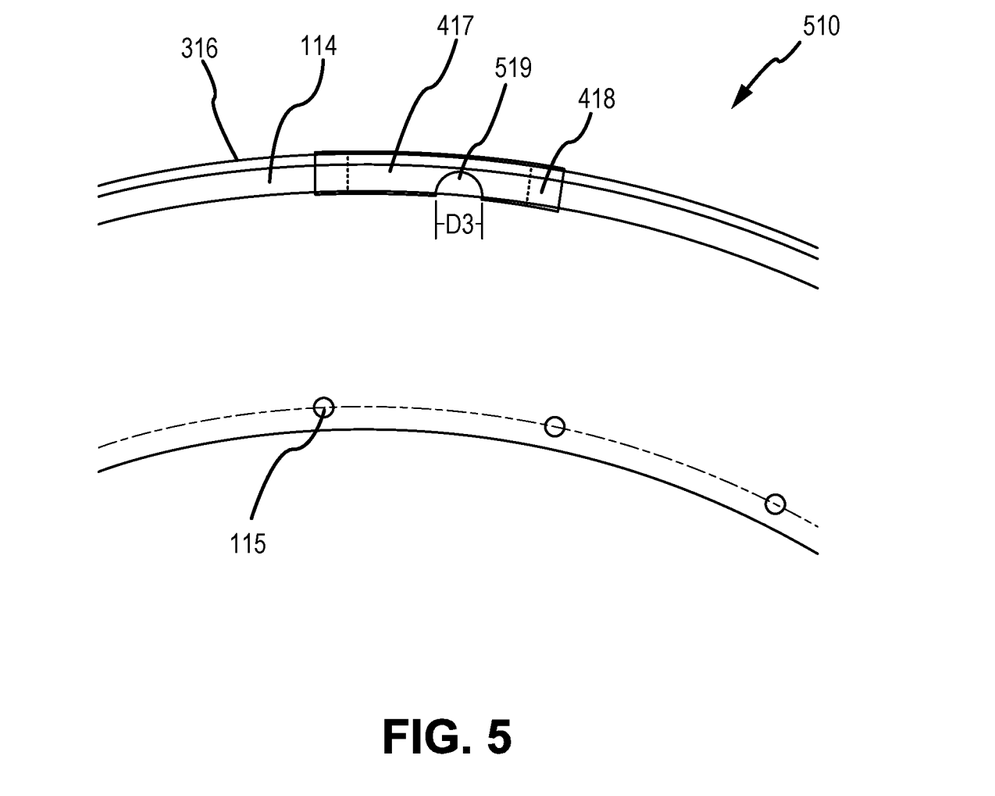
FIG. 5 illustrates an aft view of a nose cone having a spot face trimmed into a first layer and a second layer located on an aft edge, in accordance with various embodiments.

In various embodiments, and with reference to FIG. 5, first layer 417 and second layer 418 may comprise a spot face 519. Spot face 519 may be configured to enable lower tolerances in response to nose cone 510 coupling to a fan hub. For example, and with brief reference to FIG. 2D, in response to nose cone 110 coupling to fan hub 102, fan platform pin 50 may abut pin landing 114. With first layer 417 and second layer 418 installed onto repaired edge 316 and pin landing 114, fan platform pin 50 may be forced into contact with second layer 418. In that regard, spot face 519 may comprise a void defined by first layer 417 and second layer 418, that is cut away to allow for lower tolerances between pin landing 114 and fan platform pin 50.

In various embodiments, spot face 519 may comprise any suitable size to allow for lower tolerances, such as, for example, a distance D3. Distance D3 may comprise any suitable shape and/or desired size, such as the diameter of fan platform pin 50. In that regard, distance D3 may be about 0.3 inches (7.6 mm) to about 0.8 inches (20.3 mm), or about 0.5 inches (12.7 mm) to about 0.8 inches (20.3 mm) (wherein about in this context refers to only +/−0.05 inches (1.27 mm)). In various embodiments, spot face 519 may be cut from of first layer 417 and second layer 418 prior to curing first layer 417 and second layer 418. Spot face 519 may also be cut using any suitable technique, such as, for example, via a computer-aided milling machine, and/or the like. In various embodiments, spot face 519 may also be cut from any other suitable position on first layer 417 and second layer 418 where a lower tolerance may be desired.

Figure 6:
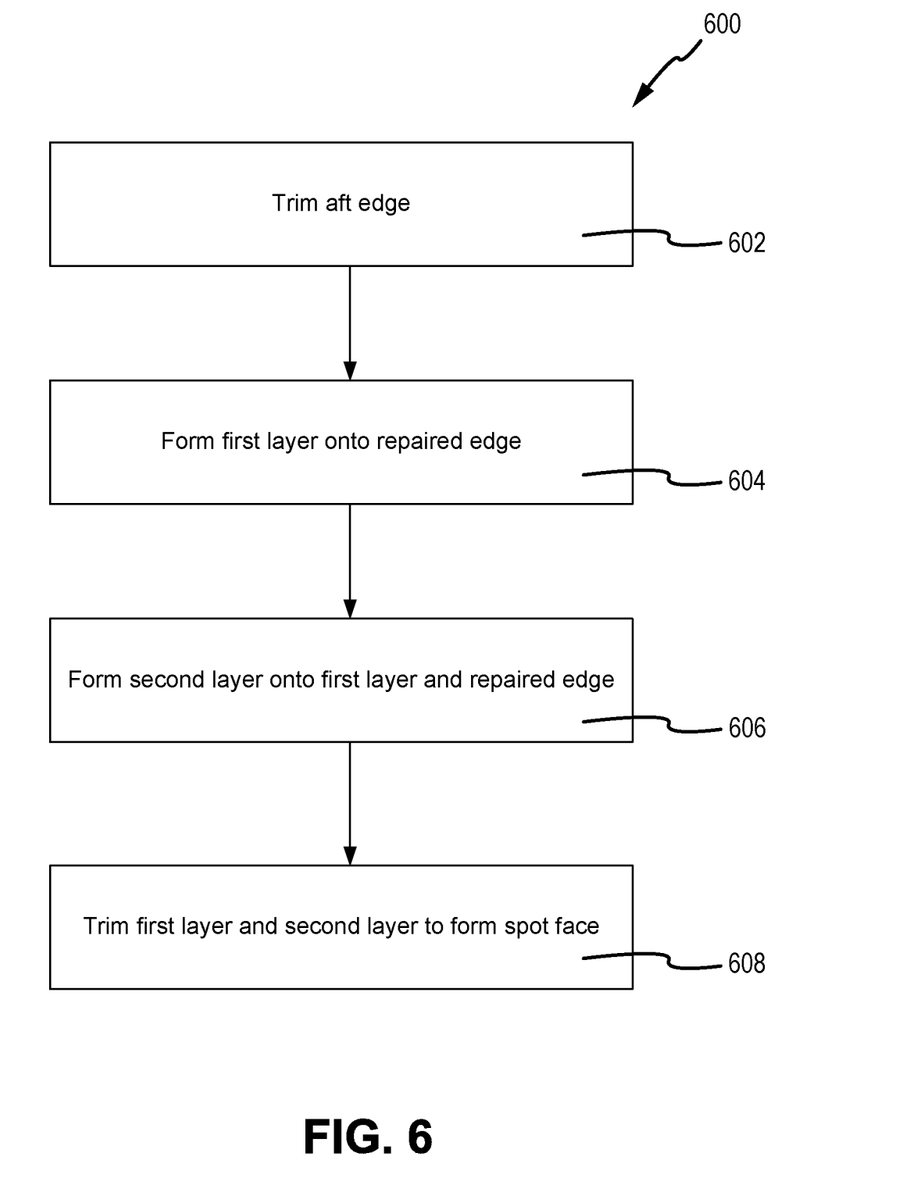
FIG. 6 illustrates a method for nose cone edge delamination repair, in accordance with various embodiments.

In various embodiments, and with reference to FIG. 6, a method 600 for nose cone edge delamination repair is disclosed. Method 600 may enable repair of nose cone edge delamination, while also optimizing strength in the repair and maintaining fit and tolerances to mating parts. In various embodiments, and with reference to FIGS. 3 and 6, method 600 may comprise trimming aft edge 113 (Step 602). Step 602 may also comprise removing erosion resistance material on the surface of outer skirt 111, cleaning the surface of outer skirt 111 (e.g., using a solvent such as isopropyl alcohol, and/or the like), and evaluating the extent of delamination. Evaluating the extent of delamination may comprise performing a tap test on the surface of outer skirt 111 (e.g., tapping a solid object on the surface of outer skirt 111 to listen for differences in the sound produced). Step 602 may also comprise filling the delaminated area with an epoxy, clamping the delaminated area, and curing the delaminated area. Trimming aft edge 113 may comprise trimming a portion of aft edge 113 to form repaired edge 316. Aft edge 113 may be trimmed using any suitable technique discussed herein and/or known in the art.

In various embodiments, and with reference to FIGS. 4 and 6, method 600 may comprise forming first layer 417 onto repaired edge 316 (Step 604). Step 604 may comprise forming first layer 417 onto repaired edge 316, and extending first layer 417 to cover a portion of outer skirt 111 and pin landing 114. First layer 417 may extend over outer skirt 111 and pin landing 114 at distance D1. In various embodiments, Step 604 may comprise forming first layer 417 using a wet layup method. In various embodiments, Step 604 may comprise forming first layer 417 using a pre-impregnated method.

In various embodiments, method 600 may comprise forming second layer 418 onto first layer 417 and repaired edge 316 (Step 606). Step 606 may comprise forming second layer 418 on top of first layer 417 to extend past first layer 417 at a distance D2. In various embodiments, Step 606 may comprise forming second layer 418 using a wet layup method. In various embodiments, Step 606 may comprise forming second layer 418 using a pre-impregnated method.

In various embodiments, and with reference to FIGS. 5 and 6, method 600 may comprise trimming first layer 417 and second layer 418 to form spot face 519 (Step 608). Step 608 may comprise trimming first layer 417 and second layer 418 at a location where a lower tolerance may be desired, such as, for example, on pin landing 114. Step 608 may comprise trimming first layer 417 and second layer 418 to form spot face 519 having a diameter of distance D3. In various embodiments, Step 608 may also comprise curing first layer 417 and second layer 418. Step 608 may also comprise pressurizing (via clamps, a vacuum bag, and/or the like), first layer 417 and second layer 418 prior to curing. Step 608 may also comprise removing unwanted resin, cleaning the surface area of first layer 417 and second layer 418, and checking repaired edge 316 (e.g., visually and/or through a tap test). Step 608 may also comprise applying a protective coating to the axially outer surfaces of first layer 417 and second layer 418, such as, for example, an erosion resistant coating, a polytetrafluoroethylene coating (e.g., Teflon® coating), polymer, ceramic, plastic, and/or any other protective material.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A nose cone, comprising:
an outer skirt having an axially inner surface opposite an axially outer surface, and a repaired edge having a first edge and a second edge, wherein the first edge is substantially perpendicular with the second edge;
a pin landing coupled to the axially inner surface near the repaired edge;
a first layer coupled to the repaired edge and having a first end and a second end, wherein the first end extends in an axial direction past the repaired edge and onto the axially outer surface of the outer skirt, and wherein the second end extends in the axial direction past the repaired edge and onto the pin landing; and
a second layer coupled to the first layer and having a third edge and a fourth edge, wherein the third edge of the second layer extends past the first end of the first layer and the fourth edge of the second layer extends past the second end of the first layer.

2. The nose cone of claim 1, further comprising a spot face located on the second layer and the first layer proximate the pin landing, wherein the spot face is bounded by the second layer and the first layer.

3. The nose cone of claim 1, further comprising a flange coupled to the axially inner surface of the outer skirt forward the pin landing.

4. The nose cone of claim 1, wherein the first layer and the second layer are formed using at least one of a wet layup method or a pre-impregnated method.

5. The nose cone of claim 1, wherein the first end of the first layer extends in the axial direction past the repaired edge and onto the axially outer surface of the outer skirt at a first distance, and wherein the second end of the first layer extends in the axial direction past the repaired edge and onto the pin landing at the first distance.

6. The nose cone of claim 5, wherein the third edge of the second layer extends past the first end of the first layer at a second distance, wherein the fourth edge of the second layer extends past the second end of the first layer at the second distance, and wherein the second distance is equal to the first distance.

7. The nose cone of claim 6, wherein the first distance is from about 0.05 inches to about 2.0 inches.

8. A method, comprising:
trimming an aft edge of an outer skirt of a nose cone to form a repaired edge;
placing a first layer onto the repaired edge;
placing a second layer on top of the first layer, wherein the second layer extends past the first layer; and
trimming the first layer and the second layer to form a spot face.

9. The method of claim 8, further comprising forming the first layer and the second layer using a wet layup method.

10. The method of claim 8, further comprising forming the first layer and the second layer using a pre-impregnated method.

11. The method of claim 8, further comprising extending the first layer in an axial direction onto the outer skirt at a first distance, and extending the first layer in the axial direction onto a pin landing at the first distance.

12. The method of claim 11, further comprising extending the second layer in the axial direction to extend past the first layer at a second distance, wherein the second distance is equal to the first distance.

13. The method of claim 11, further comprising extending the first layer at the first distance of about 0.05 inches to about 2.0 inches.

14. The method of claim 8, further comprising applying a protective coating over the first layer and the second layer.

15. A fan section for a gas turbine engine, comprising:
a fan hub;
a plurality of fan blades coupled to the fan hub; and a nose cone coupled to the fan hub forward of the plurality of fan blades, wherein the nose cone comprises:

an outer skirt having an axially inner surface opposite an axially outer surface, and a repaired edge having a first edge and a second edge, wherein the first edge is substantially perpendicular with the second edge;

a pin landing coupled to the axially inner surface near the repaired edge;

a first layer coupled to the repaired edge and having a first end and a second end, wherein the first end extends in an axial direction past the repaired edge and onto the axially outer surface of the outer skirt, and wherein the second end extends in the axial direction past the repaired edge and onto the pin landing; and a second layer coupled to the first layer and having a third edge and a fourth edge, wherein the third edge of the second layer extends past the first end of the first layer and the fourth edge of the second layer extends past the second end of the first layer.

16. The fan section of claim 15, further comprising a plurality of fan platforms coupled to the fan hub using a fan platform pin.

17. The fan section of claim 16, further comprising a spot face located on the second layer and the first layer proximate the pin landing, wherein the spot face is bounded by the second layer and the first layer.

18. The fan section of claim 17, wherein the fan platform pin abuts the pin landing at a location of the spot face.

19. The fan section of claim 15, wherein the first layer and the second layer are formed using at least one of a pre-impregnated method or a wet layup method.

20. The fan section of claim 15, wherein the first layer extends over the repaired edge at a first distance, and the second layer extends past the first layer at a second distance equal to the first distance.

* * * * *